United States Patent [19]

Holland et al.

[11] Patent Number: 4,881,178

[45] Date of Patent: Nov. 14, 1989

[54] METHOD OF CONTROLLING A CLASSIFIER SYSTEM

[75] Inventors: John H. Holland; Arthur W. Burks, both of Ann Arbor, Mich.

[73] Assignee: The Regents of the University of Michigan, Ann Arbor, Mich.

[21] Appl. No.: 47,724

[22] Filed: May 7, 1987

[51] Int. Cl.[4] .............................................. G06F 15/18
[52] U.S. Cl. .................................. 364/513; 364/200; 364/274; 364/276.8
[58] Field of Search .................... 364/513, 200, 276.8, 364/274

[56] References Cited

U.S. PATENT DOCUMENTS

| | | | |
|---|---|---|---|
| 3,950,733 | 4/1976 | Cooper et al. | 364/513 |
| 4,193,115 | 3/1980 | Albus | 364/513 |
| 4,286,330 | 8/1981 | Isaacson | 364/513 |
| 4,620,286 | 10/1986 | Smith et al. | 364/513 |
| 4,670,848 | 6/1987 | Schramm | 364/513 |
| 4,675,829 | 6/1987 | Clemenson | 364/513 |
| 4,697,242 | 8/1987 | Holland | 364/513 |
| 4,698,751 | 10/1987 | Parvin | 364/200 |
| 4,704,695 | 11/1987 | Kimura et al. | 364/513 |
| 4,774,677 | 9/1988 | Buckley | 364/513 |

OTHER PUBLICATIONS

"Genetic Algorithms and Adaptation", J. H. Holland, *Adaphic Control of Ill-Defined Systems*, Plenum Press (1984).
"Properties of the Bucket Brigade Algorithm", Proceedings of an International Conf. of Genetic Algorithms and their Applications, 7-24-26-85.
"Escaping Brittleness: The Possibilties of General Purpose Learning Algorithms Applied to Parallel, Rule-Based Systems", J. H. Holland, *Machine Learning II*, 1986.
"A Radically Non-von-Neumann/Architecture for Learning and Discovery", Burks, Proceeding of CONPAR-86, Springer-Verlag (Berlin 1986).

*Primary Examiner*—John R. Lastova
*Attorney, Agent, or Firm*—Allegretti & Witcoff, Ltd.

[57] ABSTRACT

An adaptive computing system in which a plurality of instruction-like data structures called "classifiers" are stored in a classifier memory and operate upon selected ones of the data structures called "messages" stored in a message store. Each classifier is composed of one or more condition parts which specify the attributes of messages to be acted upon; an action part which specifies the operation to be performed on those messages specified by a condition part of that classifier; and a strength value which is indicative of the past utility of that classifier. The computing system includes means for monitoring the contribution (if any) made by each classifier toward achieving a desired computational goal and for increasing the strength value associated with the more useful participating classfiers. The system is composed of a collection of interacting algorithms for controlling the current performance and the long term evolutionary growth of the system as defined by the changing contents of its classifier store, enhancing the system's adaptive capabilities without substantially increasing the computational task imposed.

26 Claims, 4 Drawing Sheets

METHOD OF CONTROLLING A CLASSIFIER SYSTEM

CROSS REFERENCE TO RELATED APPLICATION

The present invention is a an improvement over the "ADAPTIVE COMPUTING SYSTEM CAPABLE OF LEARNING AND DISCOVERY" disclosed in U.S. patent application Ser. No. 06/619,349 filed June 11, 1984 by John H. Holland and Arthur W. Burks, now U.S. Pat. No. 4,697,242 issued Sept. 29, 1987.

BRIEF SUMMARY OF THE INVENTION

The present invention relates to electronic data processing systems and more particularly to adaptive, parallel, rule-based computing systems called "classifier systems."

Classifier systems adapt to the computing task at hand by selecting useful processes from a collection of available alternatives, and by further experimentation with new candidate processes which are added to the pool of alternatives in a quasirandom manner. An adaptive classifier system selects and further improves the computational processes it uses in much the same way that nature adapts biological species to their environment: by producing new candidates, nurturing the successful, and discarding those which perform poorly.

In an adaptive classifier system, processes are carried out by the parallel execution of conditional instructions called classifiers, monitoring the results obtained, which are called "messages", and rewarding those classifiers which participate in the generation of messages that are used by other classifiers to produce further results in the form of messages.

In an adaptive classifier system classifiers compete with one another to have their messages used. To promote adaptation, various figures of merit are associated with each classifier. The most important of these is called "strength". Those classifiers which directly participate in the generation of useful results have their strengths increased. Those which produce little or nothing of value have their strengths reduced. Moreover, classifiers that have not proven to be useful (and hence have low strengths) are periodically replaced by new classifiers, which are generated by the system.

Having greater strength gives a classifier important advantages. Because the system cannot (in general) use all of the information being generated by all of its classifiers at any given time, each classifier must make a successful "bid" to get the results it generates accepted for further processing, and the magnitude of the bid each classifier makes is positively correlated with its current strength. Moreover, the stronger classifiers are preferentially selected as patterns to be used to generate new, experimental classifiers. Thus, stronger classifiers are permitted to play a much more important role in both the short-term performance and the long-term improvement of the system.

The present invention takes the form of an improved method of controlling the current performance and the adaptive evolution of a classifier system. This method has several features, all of which are ways of using strength and other measures of classifier importance to control what messages are carried over for further processing and to control the creation of new classifiers.

In accordance with a first feature of the present invention, the bid value generated by each classifier to get its result message accepted has a magnitude which is related not only to its own strength but also to the combined strengths of those classifiers which generated messages which the bidding classifier processes. Preferably, the amount bid is proportional to the strength of the bidding classifier, proportional to the sum of all of the bids made previously to get those messages accepted which are being processed by the bidding classifier, and further proportional to a factor (called the "bid ratio") which normally, but not necessarily, reflects the specificity with which the bidding classifier responds to existing messages.

In accordance with still another important feature of the invention, means are included for insuring that unproductive classifiers will have their strengths reduced by one or more of three "taxes": (1) a head tax which periodically reduces the strength of all of the currently existing classifiers; (2) a bid tax which reduces the strength of only those classifiers whose conditions are satisfied and which accordingly produce result messages; and (3) a performance tax which reduces the strength of only those classifiers which successfully get their result messages accepted for further processing.

In accordance with a further feature of the invention, means are included for the system to recognize when it has achieved desired goals and to reward its successful classifiers by increasing their strengths so as to increase the adaptability of the system. More specifically, means are preferably included for monitoring the progress of the system using predetermined criteria of success (or failure) to trigger procedures for enhancing the adaptability of the system. For example, means may be included to monitor the success of the system in producing messages of value, and if the success rate falls below a stipulated or acceptable level, these monitoring means will activate other means which will construct new classifiers from existing classifiers and from input and/or output messages and which will assign initial strengths to these new classifiers so that they can complete with the other classifiers in producing new messages.

In accordance with a further feature of the invention, means for monitoring the activity and bid payments of classifiers are combined with means for creating new classifiers that will accelerate the propagation backward of rewards and bid-payments to classifiers which contribute early to a series-parallel chain of messages that achieve the goal. Means for monitoring the activity and bid payments of classifiers are employed to detect groups of classifiers that produce series-parallel sequences of messages and are combined with means for generating classifiers which will stimulate continued activity in said group of classifiers.

Means can be included to tag classifiers so as to detect pairs of classifiers that are active on successive time steps and such that the second classifier receives a substantial payment from another classifier or from the treasury. The system can then make two new classifiers which will cause a message which is accepted by the first of the aforementioned classifiers to regularly stimulate the action produced by the second of the aforementioned classifiers. If there is a regular causal connection between the message and the action, the system will detect it.

In accordance with yet another important feature of the invention, tags are added to classifiers to define groups of classifiers which can act in concert, either at the same time or over a succession of major cycles, so that their strengths can be mutually supportive and can evolve together to make the system more adaptable. Such tags may be used to implement pointers in a network, in a linked list, or in an inference system. Tags may also be used to initiate activity in a cluster of classifiers that constitute a parallel processing version of a subroutine call. A tagging system may evolve and adapt along with the strength assignments to groups of tagged classifiers, and can be used to define species in terms of mating constraints. For many of these applications it is preferable to make the tags prefixes or suffixes, but tags can also be used as markers at these locations when the genetic algorithm is applied, so as to encourage the preservation of adaptive sub-sequences of classifiers.

The method of controlling the current performance and the long term evolutionary growth of the system as contemplated by the present invention enhances its adaptive capabilities without substantially increasing the computational task imposed.

These and other features and advantages of the present invention may be more clearly understood by considering the following detailed description. In the course of this description, reference will frequently be made to the attached drawing in which:

DETAILED DESCRIPTION

Figure 1:
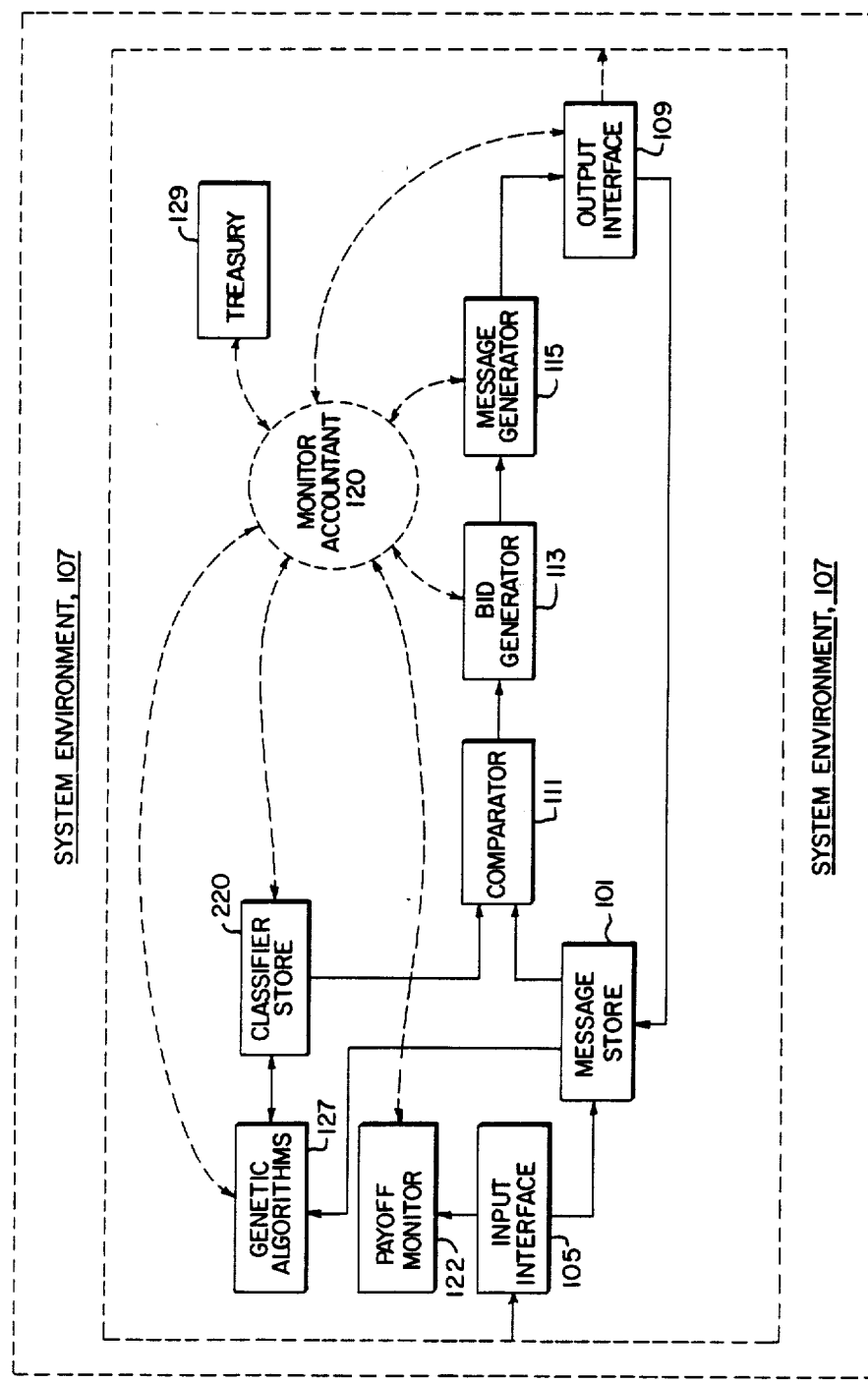
FIG. 1 is a block diagram illustrating the general organization of a preferred embodiment of the invention.

The arrangement shown in FIG. 1 is an adaptive "classifier system" for processing input data from an external source to yield output data having predetermined characteristics and represents an improvement over prior classifier systems described, inter alia, in the above-noted application Ser. No. 06/619,349 and in the following publications: "Cognitive Systems based on Adaptive Algorithms" by John H. Holland and Judith S. Reitman, *Pattern Directed Inference Systems,* Academic Press (1978); "Adaptive Algorithms for Discovering and Using General Patterns in Growing Knowledge Bases" by John H. Holland, *International Journal of Policy Analysis and Information Systems,* Vol. 4, No. 3 (1980); "Properties of the Bucket Brigade Algorithm", *Proceedings of an International Conference on Genetic Algorithms and their Applications,* July 24-26, 1985, Carnegie-Mellon University, Pittsburg, Pa; "Escaping Brittleness: The Possibilities of General-Purpose Learning Algorithms Applied to Parallel, Rule-based Systems", *Machine Learning II* (1986); "A Radically Non-von-Neumann/Architecture for Learning and Discovery", Arthur W. Burks, *Proceedings of CONPAR-86-Conference on Algorithms and Hardware for Parallel Processing,* Springer-Verlag (Berlin-1986). *Adaptation in Artificial and Natural Systems,* John H. Holland, *University of Michigan Press* (1975); and "Genetic Algorithms and Adaptation", John H. Holland, *Adaptive Control of Ill-Defined Systems, Plenum Press,* (1984)

The system to be described in more detail below includes a message memory indicated at 101 in FIG. 1. Each message in memory 101 comprises a unit of information represented as a fixed-length sequence of binary digits. These binary messages communicate information via an input interface 105 concerning the outside environment illustrated at 107 in FIG. 2, and also communicate information internally generated during the operation of the system in a manner to be described.

The system further includes a classifier memory 103 for storing a plurality of classifiers. Classifiers are analogous to instructions in conventional computer programs and consist of:

(1) a condition part for specifying the attributes of one or more selected classes of messages stored in the message memory 101;

(2) an action part for specifying the manner in which the messages in the specified classes are to be translated into output messages;

(3) a strength value indicative of the past utility of said classifier; and, (4) a "bid-ratio" value which operates as a further indicia of the potential utility of a particular classifier.

The computing system shown in FIG. 1 performs its processing operations in a series of "major cycles". As the first step during each major cycle, input data is translated into message format by the input interface 105 and placed in the message store 101 along with internally generated messages processed through the output interface 109. In the second step, all of the messages in the message store are compared with the condition parts of all of the classifiers in the classifier store 103 to identify which (if any) messages satisfy which classifiers. This step, performed by the comparator 111 seen in FIG. 1, yields a list of "matched" classifiers whose conditions are satisfied.

In the third step of each major cycle, a "bid" value is generated at 113 for each of the matched classifiers. These bid values are used to select those matched classifiers having the greatest promise of generating useful result messages. Only the successful, highest bidding classifiers are used by message generator 115 to produce new messages which are then processed through the output interface 109 and placed in the message store 101 for possible processing during the next major cycle.

In a classifier system of the class described, adaptation of the system to its operating environment is accomplished by encouraging the use of those classifiers which produce useful results, discouraging the continued participation by unproductive classifiers, and ultimately replacing unproductive classifiers with entirely new classifiers generated by random processes (including the generation of modified versions of previously successful classifiers). The "strength" value of a classifier is the principal measure of the classifier's utility, and the manner in which strength values are assigned and controlled is central to the system's ability to rapidly and usefully adapt to the desired computing task.

In accordance with the present invention, a monitoring and accounting mechanism illustrated at 120 in FIG. 1 rewards (increases the strength of) those successful classifiers in the store 103 which are used by the message generator 115 during any major cycle when useful results are obtained (as determined by a "payoff monitor" 122 which is responsive to one or more desired conditions in the external environment 107). The monitor-accountant mechanism 120 is also responsible for transferring bid payments between classifiers so that rewards given when useful results are obtained will gradually be shared with those other classifiers which, during prior major cycles, contributed messages ultimately leading to the reward condition. Still further, the strength accounting mechanism 120 punishes those classifiers which are under-achievers by taxing (periodically reducing) their strength.

In the course of controlling the flow of strength to and from the classifiers in store 103, the strength accounting mechanism 120 maintains the total strength of the system at a constant level by obtaining strength from a system treasury 129, and returning strength in the form of taxes to the treasury 129. The strength accounting mechanism 120 also assigns strength to new classifiers generated by "genetic algorithms" as indicated at 127 in FIG. 1 and returns the whatever remaining strength the weaker, replaced classifiers may have to the treasury 129.

The monitor-accountant mechanism 120 also monitors the adaptive performance of the whole system and takes actions to improve its performance in ways to be described later.

With the foregoing general description as background, attention will now be turned to the specific scheme contemplated by the present invention for controlling the flow of strength among the classifiers to promote rapid and useful adaptation.

MESSAGE STORE 101

The message store 101 holds data in the form of fixed-length binary strings called "messages" which are either internally generated within the adaptive computing system or generated by the input interface 105 based on information obtained from the external environment 107. Messages may have tags associated with them, to distinguish input messages from internal and output messages, or to represent other categories of messages useful to the system. In addition to the fixed-length binary data, each message has associated with it a "pointer" value which is used to identify the classifier (or the input interface) which produced it.

In accordance with a principal feature of the present invention, a further value called an "intensity" value is also associated with each message. This intensity value is equal to the "bid" made by the producing classifier and, as will be described, represents an important governing parameter in the adaptive processing contemplated by the present invention.

At the end of each major cycle the contents of message store 101 are erased and replaced by a new set of messages generated by the message generator 115.

In accordance with another principal feature of the present invention, the size of the message store 101 is restricted, and a competition is introduced among classifiers whose conditions have been satisfied, or which have generated new messages, to determine which messages go into the message store and become available for further processing.

INPUT INTERFACE 105

A portion of the message store 101 is used to hold messages generated by the input interface 105. Input interface 105 may comprise a plurality of "detectors" which convert information derived from the external environment 107 into the fixed-length binary format used by the adaptive system. In accordance with the invention, a user-assigned intensity value may be associated with each message generated by the input interface 105 so that the messsage will be treated as if it had been generated by a classifier making a comparable bid.

CLASSIFIER STORE 103

The classifier store 103 stores a collection of "classifiers" which function in a fashion closely analogous to the instructions which make up conventional computer programs. Like a conventional instruction, each classifier identifies the data it is to operate upon, and specifies the nature of the operation to be performed. Unlike conventional instructions, the classifiers within the store 103 are not executed in any particular sequence. Instead, every classifier is compared with every message and produces (or does not produce) a result message independent of the operation of the other classifiers within that major cycle.

The data to be operated upon is specified in one or more "conditions" which form part of each classifier. Preferably, each condition takes the form of a fixed length ternary string having the same number of ternary symbols as the number of binary symbols contained in a message. A condition specifies a class of messages as follows: Each ternary symbol {0, 1, #} in the condition is matched against the binary symbol {0, 1} at the corresponding symbol position of each message. If the ternary symbol is a 1 or 0, the corresponding message symbol matches if it has the same value. If the ternary symbol at that position is a # (also called a "don't care" symbol), then that position of the message is deemed to match regardless of its value. It may be noted that the count of # or "don't care" symbols in the conditions of a given classifier provides a measure of the generality of that classifier (and the count of 1 and 0 symbols correspondingly provides a measure of the specificity of the classifier). As will be seen, the case of measuring generality simplifies the computation of bids.

The classifier performs an operation only if at least one message exists which meets the specifications of each of its conditions. The operation itself is specified by the "action part" of the classifier which also preferably takes the form of a ternary string having a length equal to that of the messages. The operation performed is the generation of a message for each matching (set of) input message(s) and the content of the output message is specified by the action part as follows: for each 1 or 0 in the action part, the corresponding symbol position of the output message has that designated value, and for every # in the action part, the binary value at the corresponding position of a predetermined one of the input messages is copied into the output message. Thus the action part specifies a simple passing function under which each output binary symbol is either specified by the action part or copied (passed from) the corresponding position of an input message.

Although classifiers composed of the simple combination of a single condition part and a single action part of the type described above is "computationally complete"; that is, can be combined to perform any arbitrary computational operation, slight elaborations may be usefully added to provide important computational shortcuts while preserving the simplicity of the processing instrumentalities needed. By way of example, a preferred form of classifier comprises two conditions of the type described above and a "not-match" boolean value is associated with the second of the two. When the not-match value is true, the second condition is satisfied whenever no messages in the message store 101 meet its ternary specifications. An action-type value is further preferably added to the ternary portion of the action part and specifies either the simple pass function described above, or specifies that the two satisfying input messages are first combined (by logical AND, OR, EXCLUSIVE-OR, ADDITION, OR SUBTRACTION functions) before the result is passed against the masked formed by the ternary part of the action part. The two elaborations (the "not-match" and "action-type" values) allow the classifiers to perform useful operations in a much more direct fashion than would be possible with the more simplified version. A "not-match" classifier can be used to control the repeated operation of a process by being an essential link in that process. The control classifier would have a not-match condition which identifies (perhaps by means of a tag) messages concurrent with and auxiliary to the process, so that when there are no messages of this special kind the control classifier will not respond, shutting down the process. "Action-type" classifiers enable a classifier program to do calculations of traditional kinds more rapidly.

In addition to its condition and action parts, every classifier has as an associated figure of merit called its "strength" value. As will be seen, the strength value is used in the formation of the "bid" each classifier makes to obtain space in the message store 101 for the output message it produces. The strength of each classifier also plays an important role in the creation of entirely new and potentially useful classifiers by means of the "genetic algorithms" to be described.

When a classifier makes a successful bid, its strength is reduced by the amount of that bid, the bid payment being made to increase the strength of the classifier(s) that supplied the messages which activated (satisfied the conditions of) the producing classifier. Thus, strength flows backward from the supplied, successful classifiers to the supplying classifiers which made the success possible. This scheme, called the "bucket brigade algorithm" redistributes strength among the active classifiers as processing continues. The change in a classifiers strength affects its ability to bid since, as will be seen, the magnitude of each bid is directly proportional to the generating classifiers strength, and also affects the likelihood that that particular classifier will be used as a pattern (become a parent) when new and potentially useful new classifiers are generated by means of the "genetic algorithms" to be describd.

The identification tag of a classifier is stored along with it and moved with it, and also a representation of its strength. These enable monitor-accountant 120 to charge a classifier for its successful bids and to pay a classifier for the messages it produces which are used by other classifiers to make successful bids. Other parameters associated with a classifier may be stored and moved with it, such as the "bid-ratio" described next.

In accordance with a further feature of the present invention, still another value called the "bid-ratio" is associated with each classifier. The bid-ratio value may be thought of as a measure of the associated classifier's willingness to risk its strength to get its output message accepted for continued processing. Bid-ratio values may be assigned by the user, by the particular genetic algorithm which produced the classifier, or by the system itself. Preferably, when neither the user nor the generating algorithm assigns a specific bid-ratio value, the system sets it at a value directly related to the classifier's specificity (that is, to a value directly related to the number of 1 and 0 values in the classifier's conditions).

PARALLEL PROCESSING IN COMPARATOR 111

At the start of each major cycle, all of the messages in the message store 101 are compared against all of the condition parts of all of the classifiers in classifier store 111. As described in the Holland and Burks application Ser. No. 06/619,349, classifier systems of the class being described are particularly adapted to parallel processing. Messages and classifier condition comparisons can be carried out completely independently and in any order. Because each comparison can (and must be) done independently of the others, none need be done first and all can be done in parallel. When messages satisfying the condition part of any classifier are found, the bid to be associated with the newly generated message can also be calculated (in a manner to be described) based on existing information and independently of the bid calculations for the other newly generated messages. Finally, the new messages can all be calculated in parallel.

When messages satisfying the condition part of a classifier are found, these are sent to bid generator 107 along with the classifier and its associated data. When all classifiers have been compared with the messages in the message store, the contents of the latter are erased so they can be replaced at the end of the major cycle by the new set of messages generated in message generator 115.

As explained in the above-noted application, the inherently parallel nature of the computational task presented make it possible to implement the adaptive system in a machine having a highly parallel architecture, largely eliminating the sequential bottleneck which characterizes conventional "von Neumann machines." The von Neumann bottleneck is eliminated because a classifier program is essentially addressless.

BID GENERATOR 113

In the classifier system described in Holland and Burks Pat. No. 4,697,242, each classifier whose condition part was satisfied by messages from the message store made a "bid" to gets its output message or messages accepted for possible further processing, and this bid had a magnitude directly proportional to the strength of the bidding classifier multiplied times its specificity, the number of non-# (0 or 1) symbols in its condition parts.

In accordance with a feature of the present invention, the amount of the bid is preferably proportional to the classifier's strength, proportional to its "bid-ratio" and also proportional to its "relative support". That is:

BID=CONSTANT*STRENGTH*BID-RATIO*- RELATIVE-SUPPORT

In the relation above, CONSTANT is a proportionality factor, STRENGTH is the current strength of the bidding classifier (which has had its conditions satisfied by messages in the message store, BID-RATIO is a measure of the classifier's willingness to risk strength and generally takes into account the classifier's specificity (see the discussion of the CLASSIFIER STORE 103, above), and RELATIVE-SUPPORT is an additional control parameter whose formation and used are discussed under the topic "SUPPORT" which follows immediately.

Bid generator 13 then conducts an auction to determine which classifiers get their messages put in the message store, where they will be available for further processing. In a preferred embodiment the selection of winning classifiers and messages is made probabilistically, by employing a random number generator, so that classifiers making lesser bids have a sporting chance of prevailing over classifiers that make larger bids. The ways of doing this are well known in the computer art.

The determination of winning bids can be made partly parallel by having bid generator 113 broadcast to all classifiers successively lower floors of bid acceptance, until the message store is filled by new messages. In any case, the number of bids to be processed at each major cycle is small compared to the number of classifiers to be processed, so serial processing of bids would not increase the overall computation times by much.

PARALLEL PROCESSING IN MESSAGE GENERATOR 115

Each classifier which wins the auction is sent to message generator 115 along with its satisfying messages and the amount it bid. The message generator calculates the new messages, and attaches to each the bid amount and the identification of the producing classifier. This supplementary information is used in the next major cycle by monitor-accountant 120 to charge classifiers which use these messages and to pay the classifiers which produced them.

As stated earlier, these calculations can proceed in parallel.

Either the bid generator or the message generator informs the monitor-accountant of the bid amount to be paid by each successful classifier to the classifiers that produced the messages it used. Similarly, the monitor-accountant 120 is informed of the bid amount to be charged those classifiers which successfully use the new message in the next major cycle.

SUPPORT

The mechanism for controlling strength in the classifier system according to the invention is advantageously made responsive to the combined total of all of the bids made by classifiers active in the last major cycle which generated messages meeting any of the conditions of a given classifier in the current major cycle. This is done in the bid generator 113 by summing the intensities of all of the messages meeting any of the conditions of each matched classifier to yield a "support" value for that classifier. Support may thus be thought of as a measure of the combined votes (in the form of bids) made in support of the current classifier's activation by those causally related classifiers which were activated in the last major cycle. The value RELATIVE-SUPPORT is simply the support value normalized by dividing by the average support given to all of the currently bidding classifiers.

Bid values are thus made a function of the support each bidding classifier currently enjoys. As will next be seen, bid values not only control the likelihood that a given result message will be accepted for further processing, they also have an important influence on the flow of strength between participating classifiers.

OUTPUT INTERFACE 109

Messages produced by classifiers that win bids are transmitted along with the bid amount and the identification tag of the producing classifier to output interface 109. Classifiers which produce output messages or messages which the output interface should keep so tag them. The output interface keeps those messages and sends the others to the message store. Alternatively, message generator 115 can route the two types of message along parallel paths to output interface 109 and message store 101.

Output interface 109 will send messages to the outputs and action devices of the computer, computing system, or robot. But it may first process messages further by means of classifiers.

Depending on the nature of the output devices of the data processing system, the message generator might produce output messages which constitute, or lead to, incompatible instructions to an output device. If this is a possibility, output interface 109 should contain a small classifier program, including a bucket-brigade algorithm and possibly a genetic algorithm (see Monitor-Accountant 120—Strength Accounting and Genetic Algorithms 127, below) which will resolve all conflicts before messages are sent to output devices.

PAYOFF MONITOR 122

Payoff monitor 120 contains an adequate formulation of the goal of the adaptive system, and it receives sufficient messages from input interface 105 to determine when the goal is achieved. This goal might be identified from the input messages received at a single major cycle, or it might involve a succession of major cycles and the correlation of events among these. The payoff monitor might use a small classifier program to operate on the stream of input messages it receives in order to determine when the goal is achieved, or it might accomplish the task in conventional ways.

When the payoff monitor decides that the goal has been achieved, it so informs monitor-accountant 120, which then rewards each of the classifiers that had its condition part satisfied and won its bid. The reward takes the form of increasing the strength of the rewarded classifier.

CLASSIFIER PROGRAM REPRESENTATION OF ENVIRONMENTS

The environment to which a classifier system is to adjust can itself be represented as a classifier system. Similarly, a problem which a classifier system is to solve can be represented as a classifier system. The environment or problem so represented can be dynamic and changing, governed by its own laws. The complete classifier system can be set up so that the environmental classifiers system changes independently of the adaptive classifier system, or so that the two interact.

Organisms and robots can be represented by adaptive classifier systems, and their operation modeled in a classifier-represented environment. In this case, the whole classifier complex constitutes an ecological model. Since classifier systems can evolve, classifier ecological models can evolve.

MONITOR-ACCOUNTANT 120—STRENGTH ACCOUNTING

Monitor-accountant 120 performs two interrelated functions. It does the strength accounting, and it monitors the performance of the system and uses the information gained to direct and control the operation of the system.

In accordance with the present invention, an improved mechanism for modifying the strength of the classifiers in store 103 encourages the rapid adaptation of the system to its environment. This mechanism, as schematically depicted at 120 in FIG. 1, performs the following functions:

1. it "rewards" those classifiers which were active (responsible for the generation of messages from message generator 115) during any major cycle in which the payoff monitor 122 generates a "reward". It does this by adding strength points to the active classifiers (the added points being obtained from a system treasury, shown at 129 in FIG. 1, to maintain the total system strength at a constant level);

2. it pays the amount bid by each message-generating classifier which won its bid to those classifiers which supplied the messages which made its activation possible. The strength of the successful (supplied) classifier is decreased by the amount of its bid, the bid amount being transferred to and shared by the supplying classifiers. Since the amount bid also related to the bid-ratio and relative support of the bidding classifier, those factors also control the flow of strength. If an input message which satisfied a condition of the successful classifier came from the input interface 105 rather than from a classifier active in a prior major cycle, its share of the reward is returned to the system treasury 129. If the successful classifier has a "not-match" condition, no particular classifier can be said to have contributed to the satisfaction of the not-match condition, and no payment is made (i.e., no strength is transferred from the successful classifier for the not-match condition);

3. it "taxes" classifiers by transferring their strength to the system in one or more of three ways:
  a. a "head tax" may be imposed on all classifiers in the classifier store 103 by decrementing their strength values by a small, predetermined amount on each (or periodic) major cycles. The head tax exacts an intentional charge or penalty and ultimately disposes of those classifiers which do not participate in the activity of the system because they never bid (and would otherwise never risk loosing strength), and hence cannot contribute to the problem-solving ability of the system;
  b. a "bid-tax" may be imposed on all classifiers whose condtions are satisfied (as identified by the comparator 111) and which generate bids (in bid generator 113). The bid tax penalizes those classifiers which, perhaps because of overly general conditions, bid frequently but are seldom successful and which consume system resources by needlessly invoking bidding activity; and
  c. a "producer tax" may be assessed against those classifiers which win the bidding competition and successfully produce messages. The producer tax intentionally charges those classifiers which burden the system with messages but which are seldom rewarded (either for direct participation when a reward is generated by the payoff monitor 122 or indirectly by supplying messages to successful classifiers). The producer tax may be a fixed amount for each classifier whose bid is successful and hence has its message(s) carried over to the next major cycle, or it may take into account how many messages the classifier produces and/or the generality of the condition part of the classifier.

It should be emphasized that taxes play a natural economic role in a classifier system, since this system adjusts so as to make maximum use of its classifiers in order to learn from and adapt to its environment.

4. it transfers strength from the system treasury 129 to classifiers newly created by the discovery algorithms 127, and deposits any remaining strength in the classifiers which are discarded (replaced) into the system treasure 129.

MEASURING THE CONTRIBUTIONS OF THE PARTS TO THE WHOLE

Consider a classifier program solving a problem under the direction of the bucket-brigade algorithm. The bucket-brigade algorithm constantly adjusts the strengths associated with the classifiers. After the problem is solved, the strength of each classifier is a good measure of its contribution to the ability of the whole program to solve the problem.

There is an important sense in which a computer program taken as a whole is greater that the sum of its parts, for the success of the whole program depends crucially on the interconnections of its parts. In the case of classifier programs the bucket brigade algorithm is able to measure the contribution made by each instruction (classifier) to the success of the whole program (classifier system).

GENETIC ALGORITHMS 127

We have described a computing system that learns by repeated competition between its instructions (classifiers). The system evaluates each instruction in terms of its contribution (or lack of it) to the successful solution of a problem. For this purpose a measure of success is attached to each classifier, its "strength". When a problem is solved the payoff process is begun by increasing the strength of those classifiers which are active at the time of solution.

Over successive trials (learning runs) these rewards gradually percolate backwards and increase the strengths of those classifiers which contribute messages to the earlier parts of a successful run. In contrast, those classifiers which do not contribute to this successful stream of messages do not receive increases of strength. As a result, the latter classifiers gradually become weaker in comparison with the former classifiers.

This general procedure is called the bucket-brigade algorithm because of the pass-back nature of its method of payments. The bucket-brigade algorithm may use other measures of merit and character associated with a classifier besides strength, including specificity (versus generality), and support (the cycle by cycle associations of the classifier with other classifiers).

The bucket brigade algorithm involves a bidding auction, payments (transfers of strength), and taxes. Its operation is described above under the headings: comparator, bid generator, payoff monitor, and strength accounting.

A classifier program begins with a given assignment of strengths; normally the same strength is assigned to each classifier. Over repeated successful runs this strength assignment changes to adapt to the problem (environment). Thus the learning process involves gradual shifts of strengths so that some classifiers come to play important roles in the computation, while others play lesser roles, and still others make no contribution at all.

Thus, the bucket brigade algorithm is a procedure for evaluating computer instructions indirectly, according to their success in getting their products (messages) used by other instructions in repeated competition. Since the bucket brigade algorithm modifies the strength assignment to classifiers over successive trials, it can succeed for a wide range of initial assignments. However, its learning power is limited by the potentialities inherent in the starting set of classifiers.

The genetic algorithm is a procedure for overcoming this limitation and thus increasing the adaptive scope of classifier systems. This algorithm periodically selects the best or fittest classifiers, produces new classifiers from them, and substitutes these new classifiers for some of the poorest classifiers.

In deciding which classifiers are best (and which poorest) the genetic algorithm uses measures developed by the bucket-brigade algorithm. One possible method is to use relative strength as a probabilistic measure in choosing classifiers for the genetic algorithm to operate on.

More complicated measures for selection and rejection will often do better. For example, even when a classifier does not make a bid in a given major cycle, a hypothetical bid value can be calculated for it, by using a record of its past support. Such hypothetical bid values can be employed as a basis for selecting those classifiers which are to have genetic offspring. Mating can also be made contingent on the activity of classifiers, and on the presence of certain tags. The repeated success of groups of classifiers in producing messages that are used by one another is another possible criterion for breeding selection.

The construction of new classifiers and substitution of them for old classifiers is carried out by genetic algorithms 127. Preferably this unit makes some of these calculations each major cycle, in parallel with other calculations of the system. Preferably, the selection of classifiers for breeding and for elimination is done with some probabilistic variance. Genetic algorithms 127 may be guided in its operations by information resulting from the monitoring activities of monitor-accountant 120.

The purpose of a genetic operation is to rearrange the information in classifiers in ways that potentially contribute to the adaptive powers of the system. There are many possible such operations, including computer versions of operations used by biological systems.

Classifier mutation and crossover are two biologically based operations that we have found to be very important in classifier adaptive systems. Mutation alters single letters of a classifier. Thus if the alphabet is ternary $(0,1,\#)$, each character is subject to change into another ternary character with some low probability, called the mutation rate. This rate is subject to the control of monitor-accountant 120.

Crossover operates at a higher grammatical level than mutation, rearranging blocks of letters. Two high-quality classifiers are chosen, and then a linear position along a classifier word is chosen at random, dividing each classifier into an initial part and a final part. One new classifier is made by juxtaposing the initial part of the first and the final part of the second. The other new classifier is made by juxtaposing the initial part of the second and the final part of the first. Then these new classifiers are inserted in classifier store 103 in place of two classifiers of poor quality.

Figure 4:
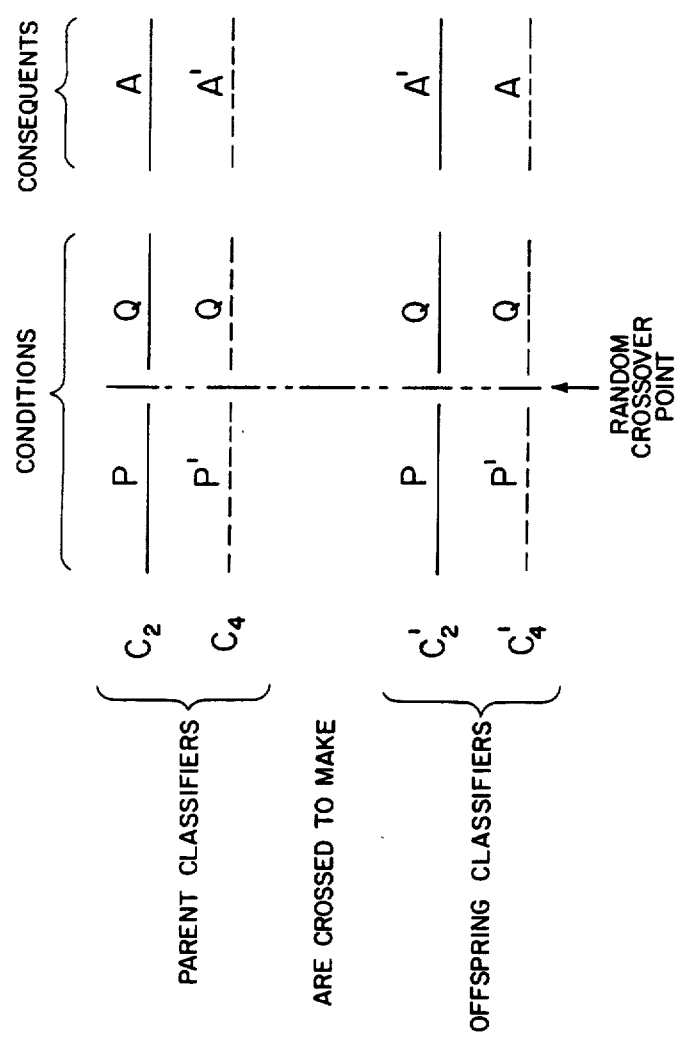
FIG. 4 shows how the genetic operator of crossover can reassociate the connections between circumstances or data and responsive calculations or actions, possibly producing a useful new rule.

For example, FIG. 4 of the drawings shows how crossing the rule

IF P AND Q ARE THE CASE THEN DO A with the rule

IF P' AND Q ARE THE CASE THEN DO A' may yield the very different rule

IF P AND Q ARE THE CASE THEN DO A'.

If A' is the appropriate action for circumstance P in the context Q and action A is not, crossover has produced a useful rule.

The following very simple example illustrates how the genetic algorithm might work. Suppose that at one major cycle of a bucket-brigade run, the status of the system is as follows:

| CLASSIFIERS | $C_0$ | $C_1$ | $C_2$ | $C_3$ | $C_4$ | $C_5$ | $C_6$ | $C_7$ |
|---|---|---|---|---|---|---|---|---|
| STRENGTHS | .11 | .03 | .26 | .04 | .20 | .17 | .05 | .14 |

The machine might then delete the three weakest classifiers and replace them by three new classifiers derived genetically from the best of the remaining classifiers, making the selections and carrying out the genetic operations probabilistically. Thus crossover might produce, using the mechanism illustrated in FIG. 4, the following:

| | | | | | | | | | | | | | |
|---|---|---|---|---|---|---|---|---|---|---|---|---|---|
| CLASSIFIER $C_2$ | # | 1 | 0 | 1 | # | 0 | 1 | 1 | 0 | 1 | 0 | 1 | |
| CLASSIFIER $C_4$ | 0 | 1 | # | # | 0 | 1 | 1 | # | # | 0 | 1 | 1 | |
| RANDOM SOURCE | 1 | 1 | 1 | 1 | 0 | 0 | 0 | 0 | 0 | 0 | 0 | 0 | |
| CLASSIFIER $C_2'$ | 0 | 1 | # | # | # | 0 | 1 | 1 | 0 | 1 | 0 | 1 | - REPLACES $C_1$ |
| CLASSIFIER $C_4'$ | # | 1 | 0 | 1 | 0 | 1 | 1 | # | # | 0 | 1 | 1 | - REPLACES $C_3$ |

↑
CROSSOVER POINT

Whereas motation might effect the following transformation:

| | | | | | | | | | | | | |
|---|---|---|---|---|---|---|---|---|---|---|---|---|
| CLASSIFIER $C_5$ | 0 | # | 1 | 0 | 1 | # | 1 | 1 | 1 | 0 | 1 | 0 |

| -continued | | | | | | | | | | | | | |
|---|---|---|---|---|---|---|---|---|---|---|---|---|---|
| RANDOM SOURCE | 0 | 0 | 0 | 0 | 0 | 1 | 0 | 0 | 0 | 0 | 0 | 0 | |
| CLASSIFIER C5' | 0 | # | 1 | 0 | 1 | 0 | 1 | 1 | 1 | 0 | 1 | 0 | - Replaces C5 |

MUTATION POINT

Tags may be inserted at various positions in a classifier to have the effect of increasing the probability that crossover will take place at a tagged position. These tags may be inserted by the programmer initially, or by monitor-accountant 120 during classifier computations.

The breadth of adaptation of the genetic algorithm is further increased by ways of making new classifiers that incorporate other relevant materials of the system. For example, genetic algorithms 127 can generate a new classifier condition that is relevant to the environment by replacing some of the bits of an input message by don't care symbols. The accountant-monitor could detect if no new messages were being generated, or if some particular type of message was not being responded to, and then call for the construction of new classifiers that will respond to these messages.

The behavior of a robot which is interacting with an environment is limited by the input messages the robot receives and the output actions it can take. If this information is incorporated in the system, the genetic algorithm can create classifiers that respond to these messages and generate those actions.

A classifier system could work with double classifiers, similar to diploid genetic programs, with a relation (perhaps probabilistic) of dominant and recessive holding between character strings in the processing of messages. Crossover could then take place within a single classifier, and the operation of inversion could be used.

Further operations for genetic algorithms 127 will be discussed in connection with the monitoring functions of monitor-accountant 120. A classifier program with the bucket brigade and genetic algorithms is a computing system which embodies earlier theoretical results concerning adaptive and evolving systems. This connection will be explained at the end of this disclosure, in the section "The relation of classifier systems to Holland's theory of adaptive systems".

TAGS

External tags may be attached to messages and classifiers for accounting purposes. For example, the identification tag of a classifier can be attached to the messages it produces for the purpose of transferring strength payments from users of messages to producers of messages.

Tags may also be employed within classifiers to play roles in the generation of messages and in the application of genetic operators. (Such tags may also arise spontaneously as a result of classifier and message processing.) For example, tags may function to facilitate crossover at certain points, and thus to increase the chance of contiguous sequences of letters (schemata) being preserved during crossover. (See the section "The Relevance of Earlier Adaptive Systems Theory to Classifiers" below for a discussion on the role of schemata in adaptation.)

Tags also provide a standardized method for coupling rules in a classifier system. Though the form used for this is simple, the ways in which such tags arise and evolve under the bucket brigade and genetic algorithms are important. For example, rule C1 may be coupled to rule C2 by a tag that the action part of C1 puts in a message, where the tag is such that the condition part of C2 responds to messages that contain that tag. With this arrangement C1 in effect sends messages "addressed" to C2.

Though any set of locations can be used to specify a tag (they need not be adjacent locations), it is often efficient for the tag to be a prefix or suffix.

Tags which provide couplings have important effects. Among these are the following two. First, as is always the case with couplings, a tagged coupling provides a bridge across which the bucket brigade procedure can operate. As a result, if the tag has been instrumental in the production of a beneficial coupling—for example, a coupling that provides part of a sequence of actions leading to payoff—then the rules employing that tag will be strengthened.

Second, because each tag can be identified with a schemata, tags are subject to the same kinds of selection and modification as any other schemata under the bucket brigade and genetic algorithms. In particular, a tag can serve as a building block that will implement couplings involving new (offspring) rules.

It follows from the above explanation that a tag that provides useful couplings will tend to spread within the system. This is so because the tag appears in rules made strong by the bucket-brigade, and such rules are preferentially selected as parents by the genetic algorithm. The tendency of useful tags to spread has important effects. Some of the most important of these is a tendency of tags to become associated with related clusters of rules in a way that gives conceptual meaning to these clusters. This idea is worth explaining in more detail.

The way in which tags may become associated with related clusters of rules is the following. Suppose a successful parent rule employs a tag that provides useful couplings for its offspring. Then that tag becomes associated with the resulting cluster of rules. As a consequence of this association, the tag serves not only to provide bridges between relevant classifiers, but it also becomes a means by which these rules can be "addressed". Furthermore, since the rules of this cluster produce interrelated calculations, the cluster has a conceptual meaning. If the range of the cluster extends from input stimuli to output actions, this conceptual meaning is pragmatic or action-related in nature.

A particular case of the above is that in which tags initiate simultaneous activity for all the rules of a cluster. This is a parallel-processing version of the sub-routine call.

One of the simplest uses for tags is to provide simple and regular implementations of networks (such as semantic nets) in classifier systems. For example, market passing can be done by means of tags. The tagging technique can be used to implement pointers in networks, linked lists, inference systems, and the like.

It should be emphasized that while tags may be inserted in a classifier program by the programmer, tags can emerge spontaneously in classifier systems operating with the bucket brigade and genetic algorithms. Such a system is continually producing classifiers which are variants of strong classifiers. By chance an offspring may have a combination of bits in its message specification part (action part) that couples it to another strong classifier. The offspring then gains additional strength under the bucket brigade algorithm because of the bridge provided by the coupling.

This gain in strength on the part of the bridging classifier increases the probability it will become the parent of still other classifiers. And because this tag shares in the parent classifier's increased fitness and strength, it will become a building block (that is, a schema of above average fitness) under the genetic algorithm.

The particular combination of bits that serves as a tag is arbitrary in that other combinations could serve the same function. This arbitrariness makes it easier for a classifier system to discover tags. This arbitrariness illustrates a conventional aspect of language. A given concept is represented in a particular language by certain symbols, but logically speaking other symbols could have performed the same function.

HIERARCHIES

Standard software is generally organized hierarchically, and classifier software can be organized similarly. Classifier systems are specially suitable for employing, evolving, and developing an adaptive kind of default hierarchy.

Consider some organized structure of cases or situations represented by a complex of classifiers. Such a classifier complex constitutes a theory, containing rules to identifiy the cases, and to express the relations and causal connections involved in the structure being represented. In a fully explicit theory, each rule has all the conditions needed to identifiy the cases for which its response is appropriate. Such explicit theories are often complex and cumbersome. Also they are difficult to modify when new information is acquired, and when there is a change in the structure of the situation depicted by the theory.

A classifier default hierarchy constitutes a simpler and more adaptable type of theory representation than a fully explicit theory. It consists of one or more default rules each of which handles a large class of cases simply and correctly, together with exception rules which handle correctly the less frequent and more special cases to which the default rules would give wrong or inefficient responses.

In an explicit heirarchical theory, the entire burden of determining which rules are applied in a given situation is carried by the conditions of the rules. This often requires complex conditions, and they may lead to contradictions because the conditions have not been formulated fully and coreectlty.

Classifier default heirarchies overcome these problems by means of the bucket brigade algorithm. Without this algoritm, the decision as to whether a classifier rule is applied in a given qualitative or relational situation depends only on whether the condition part of the rule is satisfied. But with the bucket brigade algorithm, this decision depends also on the strength of the rule relative to the strengths of other rules which have had their conditions satisified, as well as on such factors as the generality of the rules involved.

When a classifier default hierarchy or theory operates in an environment, bucket brigade algoithm enables it to develop (over a succession of trials) a strength assignment (and possibly other atttibutes) which enable it to arbitrate successfully and efficiently between the competing rules of the hierarchy. Moreover, the genetic algorithm enables the default hierarchy to develop an improved set of rules. This adaptiveness of a classifier default hierarchy extends to envoronmental contexts which are changing and evolving.

The nature and functioning of tags is explained in the preceeding section. Tags can play important roles in default hierarchys. For example, tags can facilitate the discovery of bridging classifiers that represent causal connections in the environment. (Bridging classifiers are further explained in the section MONITOR ACCOUNTANT 120—MONITORING.)

Classifier default hierarchies are efficient and useful devices for representing theories of static, dynamic and changing environment. These default hierarchies can improve themselves and they can emerge and develop.

EXTENDED ALPHABETS

We have been using (0,1) and (0,1,#) as alphabets for messages and classifiers, respectively. These alphabets can be generalized in obvious ways as long as they preserve the distinction between the generality of classifiers and the specificity of messages. These alphabets can also be extended in ways that interact with the genetic algorithm to provide more efficient rule (classifier) discovery.

A simple extension is to use a punctuation mark (";" for example) to increase the probability of crossover whenever it occurs within a condition part or an action part of a classifier. Several occurrences of the punctuation mark will further increase the probability of crossover.

Such a punctuation mark would play no role in the operation of a classifier. But, it would be used by genetic algorithms 122 during crossover, and it would be passed on to offspring in the same manner as any other symbol. As a consequence, schemata could be defined by the system in terms of useful positionings of the punctuation mark. This in turn would have the result that placements of the punctuation mark which tend to break classifiers in useful places would become building blocks for future generations of classifiers. By this means, the selective powers of the genetic algorithm can establish useful segmentations in condition and action terms.

Tags composed of special symbols can be used as constraints on the allowable pairings for genetic operators such as crossover. Such tags are appropriately called "mating tags". Ordinary symbols can also be used for this purpose, but more discriminations can be made if special symbols are used in mating tags. Mating tags play no role in deciding what messages satisfy a condition or in producing new messages.

A "don't" care symbol (e.g., "#") can be used in a mating tag to widen the class of mating tags accepted. For example, a classifier with mating prefix aaba could be bred only with classifiers having the same prefix, while a classifier with prefix aab# could be bred with classifiers with mating prefixes aaba, aabb, or aab#. Crossover can take place within mating tags, so crossover can produce offspring with different mating tags.

When mating tags are subject to crossover and selection under the bucket brigade and genetic algorithms, a classifier system gains the ability to determine mating clusters adaptively. Consider, for example, classifiers that share a mating tag and produce offspring which develop strengths that are above average. This will result in an increase in the number of classifiers belonging to this mating cluster. In other words, the number of classifiers carrying this mating tag will increase. Other kinds of tags which are adaptively beneficial will spread through a population in a similar manner.

It is of interest to consider the circumstances under which a class of tags is likely to spread through a population of classifiers.

Suppose that the ancestors or founding members of the cluster have building blocks (schemata) with the following property: when they are recombined under crossover they yield a variety of condition and action terms that are useful in reacting to the system's environment. Tags with this property will tend to spread through the population. On the other hand, if the classifiers sharing tags of the given class produce below average offspring, these tags will tend to disappear from the population.

These two tendencies—the proliferation of mating tags that are useful, and the dying out of mating tags that are not—operate together so as to have an important influence on the rate at which useful compounds of building blocks (schemata) are constructed. Because of these two tendencies, a classifier system with mating tags tends to gradually produce more and more classifiers which contain combinations of building blocks (schemata) which help the system adjust to its environment.

MONITOR-ACCOUNTANT 120—MONITORING

We have described three levels of a classifier system: basic classifiers generating new messages from old messages each major cycle, basic classifiers with the competitive mechanism of the bucket brigade algorithm, and both of these with the genetic algorithm added. There can also be a fourth level, for monitoring and controlling the preceding three levels. This function is carried out by a program in monitor-accountant 120. The program can be a classifier program or a standard type program.

The monitoring program collects statistics on the operation of the system, such as the number of new messages generated each cycle, the genetic variation in classifiers. It also collects sample histories, for example, histories of interacting classifiers that respond to successive input messages. It uses this information to control various parameters, such as bid ratios, the probability distribution in bidding, and the genetic rates of mutation and crossover.

Using this information, the monitor-accountant applies certain criteria of success and failure to trigger the operation of procedures that are likely to enhance the adaptability of the system. For example, if the number of new messages being produced falls below an acceptable level, then monitor-accountant 120 constructs new classifiers by generalizing messages to make classifier conditions and combining these new conditions with old action terms. This would correct a failure of the system to respond to certain messages from the environment.

On the basis of information about the activity and bid-payments of classifiers, monitor-accountant 120 can create classifiers that will accelerate the propagation backward of rewards and bid-payments to those classifiers which contribute early in a successful run. The system can track the activity and bid payments of classifiers and in that way detect groups of classifiers that produce series-parallel sequences of messages. Using this information, monitor-accountant 120 can generate classifiers which will stimulate continued activity of the classifiers in said group.

Monitor-accountant 120 can employ tags to detect pairs of classifiers that are active on successive time steps and such that the second classifier receives a reward from the treasury or a substantial payment from another classifier. The system can then couple the condition of the first classifier to the action of the second classifier so there will be an invariable connection between the two. This is done as follow.

Let the two classifiers that are active in succession be "If $C_1$ than $A_1$" and "If $C_2$ then $A_2$". The genetic algorithm will cross $A_1$ with $C_2$ to make two crossed results. Next, the genetic algorithm will take one of these crossed results, X, and use it to form the two classifiers "If $C_1$ then X" and "If X then $A_2$". Finally, these two new classifiers will be added to the set of classifiers.

These two new classifiers will have the following effect. EVERY message which satisfies $C_1$ at some time step will cause response $A_2$ on the next time step. It follows that if there is a regular causal connection between the messages accepted by $C_1$ and the messages produced by $A_2$, this new pair of classifiers will detect it. Thus, this procedure for detecting correlations of messages on successive time steps and constructing new classifiers on that basis, is a mechanism for discovering causal connection in the environment.

The monitor-accountant might acquire or be given statistical information about how many major cycles the classifier system should run in an attempt to solve a problem. If the system does not succeed within this bound the monitor-accountant can then stop the run and have the system begin another run. If the classifier system is successful part of the time, and hence earning some rewards, the monitor-accountant can punish it when it fails to achieve success in the allotted time. It can punish the system by reducing the strength of those classifiers active at the time the system is stopped. Furthermore, a classifier system which is generally successful in solving a problem or a class of problems can develop its own criteria for stopping unsuccessful runs.

The monitor-accountant can track classes of classifiers that are identified by tags. It can monitor and control the reproductive rates of classifiers, either generally, or differentially with respect to mating tags.

A classifier may produce several messages in a major cycle, and if that classifier wins its bid all of these messages would normally be carried over to the next major cycle for the given bid amount. But a classifier of high generality might produce a large number of messages, and thereby gain undue influence on the message list. The monitor-accountant can regulate such matters as these.

PARALLEL AND SERIAL PROCESSING OF CLASSIFIERS

Figure 2:
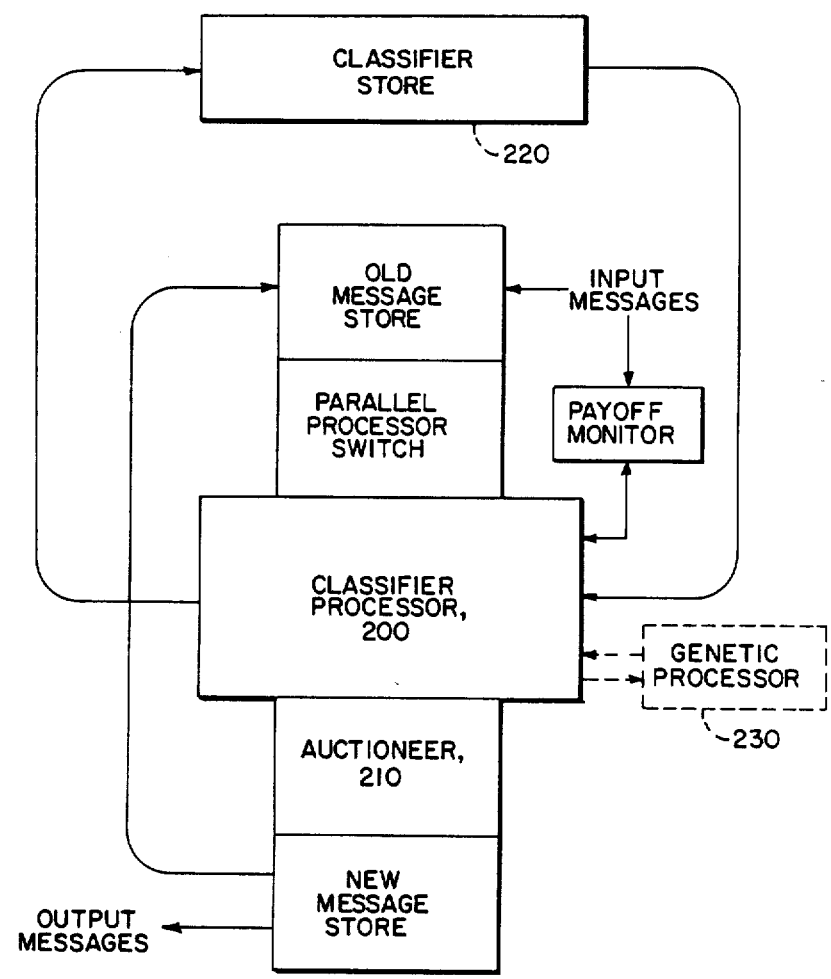
FIG. 2 is a block diagram of a first implementation of the present invention using a parallel processing hardware architecture.
Figure 3:
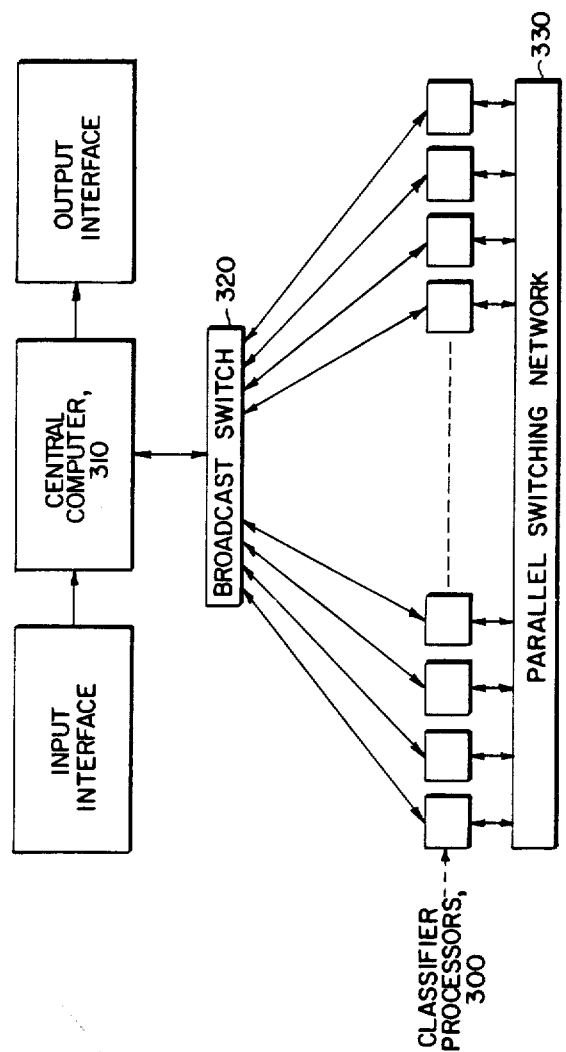
FIG. 3 shows an alternative, multiple processor parallel architecture that may be employed to implement the present invention.

The central operation in classifier calculations is the application of every classifier to every message. Logically speaking this can be done simultaneously, but from a practical point of view some serial processing is needed. FIG. 1 shows one computer organization for classifier computation, and FIGS. 2 and 3 show two alternatives. These figures illustrate different mixtures of parallelism with serialism for classifier computation.

In FIG. 2 classifiers are cycled through a processor 200, either one per minor cycle or a few per minor cycle. Each classifier is compared with all old messages in parallel. If the condition part of a classifier is satisfied, then new messages are produced and the classifier's bid to get them carried over is calculated. The new messages, the bid, and associated tags are sent to an auctioneer 210, and the classifier is returned to a classifier store 220. The auction is conducted near the end of the major cycle and a genetic processor 230 operates on some fraction of the classifiers at that time. Payments are made during the next major cycle, as the classifiers come through the classifier processor.

FIG. 3 has a large number of independent classifier processors 300, thousands, or orders of magnitude more. Each of the classifier processors 300 is capable of storing one classifier (or a few) and processing message acceptance, new message generation, and strength accounting for its classifier(s). There is a central computer 310 which stores the message list, supervises the computation, executes the genetic algorithm, and monitors the functioning of the system.

The broadcast switch 320 is a highly parallel switch which enables the central computer 310 to send information such as messages, calculation control signals, and bid floors to all classifier processors 300 at once. The broadcast switch 320 can receive information such as bid signals and new messages from the classifier processors 300 in highly parallel fashion.

A parallel switching network depicted at 330 in FIG. 3 is a partially parallel switch, the interconnections among classifier processors 300 which enable them to communicate to one another in a relatively few steps. Switch interconnections such as an N-cube or a shuffle network would be suitable for the parallel switching network 330. This switch is used by the classifier processors 300 to communicate bucket brigade payments between one another.

A major cycle involves the following component steps. The central computer 310 broadcasts the messages to the classifier processors 300 in sequence, and the latter process each message in turn, storing the messages that are accepted.

Classifier processors 300 whose classifiers have been satisfied then calculate their bids. The central computer 310 conducts the bucket brigade auction by sending out a succession of lower and lower bid acceptance floors, one of the classifier processors 300 responding immediately if its bid is above the received floor. Those of the classifier processors 300 whose bids are accepted are so signaled by the central computer 310, and they calculate their new messages and send them to the central computer 310.

Under the direction of the central computer 310, the classifier processors 300 that have produced new messages exchange payments with the classifier processors 300 that produced the messages used to make these new messages. They do this via the parallel switching network 330.

The central computer 310 then executes the genetic algorithm, obtaining the classifiers for this from the classifier processors 300 and returning the new classifiers to them via the broadcast switch 320.

The central computer 310 performs the goal-achievement and reward payoff function and various monitoring functions.

Almost all current computers have descended from the original von Neumann single bus architecture as first described by Arthur Burks, John von Neumann, and H. H. Goldstine, in the paper PRELIMINARY DISCUSSION OF THE LOGICAL DESIGN OF AN ELECTRONIC COMPUTING INSTRUMENT, Institute for Advanced Study, Princeton, 1946. Computers have evolved greatly from this design, and in the course of this evolution the original single store, single processor, and single bus interconnecting them have been parallelized in many ways. Thus the hardware "von Neumann bottleneck" has been eliminated.

But there was also a "software" von Neumann bottleneck, and it is still with us. The first program languages used addresses both for connecting instructions to the data they operated on and to help sequence the execution of instructions. Computer software has grown tremendously in sophistication during the intervening decades, and many new forms of addressing and automatic indexing have been developed. But addresses still play basic roles in modern software. An instruction is connected to its datum or data by some address mechanism. More important, an instruction cannot be executed until it has received enabling signals from one or more other instructions which address it. These addressing constraints impose a certain minimum amount of intrinsic serialism on current computers.

In contrast to standard computer programming systems, every classifier (instruction) can be processed at the same time. Moreover, no addresses are needed to connect instructions to data (messages). Thus classifier systems are not limited by the intrinsic serialism of standard computer systems, and can be executed in computer hardware not restricted by the software bottleneck, such as the hardware organizations illustrated in FIGS. 2 and 3 of the drawings.

THE RELEVANCE OF EARLIER ADAPTIVE SYSTEMS THEORY TO CLASSIFIER SYSTEMS

A classifier computing system employing both the bucket brigade algorithm and the genetic algorithm is a more powerful adaptive system than a system reinforcing correct behavioral responses to stimuli or a standard neural network or connectionist learning system.

Though classifier systems had not been invented at the time Holland published his ADAPTATION IN NATURAL AND ARTIFICIAL SYSTEMS, cited at the beginning of this application, his book established the theoretical possibility of computing systems with certain learning, discovery, and adaptive capacities. Classifier systems in fact have these capacities, and they are the first computer systems that do. We will state briefly the essence of the adaptive theory of Holland's book, for this theory helps to explain how classifier systems adapt.

Chapter 5, "The Optimal Allocation of Trials," studies a theoretical system that both investigates its environment and takes adaptive action in that environment. The system considers two or more alternative probabilistic hypotheses about the environment. The chapter analyzes and solves the theoretical problem of how much effort the inquiring-adapting system should devote to testing competing hypotheses, and how much effort the system should devote to employing the results of the most probable hypothesis.

Theorems are established in Chapter 5 concerning the optimum allocation of trials to alternative hypotheses. The relevance of this chapter to classifier systems is that such a system simultaneously explores and adapts to its environment, using the knowledge learned so as to improve its interactions with its environment. The system considers alternative hypotheses about a system it cannot examine directly and repeatedly tests these hypotheses by checking their predictions against observed results, while concurrently employing re results of its investigations.

Chapter 6, "Reproductive Plans and Genetic Operators", deals with reproductive structures. Though computer instructions such as classifiers had not been invented at the time the book was published, classifiers are in fact examples of the reproductive structures discussed in the book. This is so because genetic operators can be applied to classifiers, in the ways explained above. Hence the theorems established in Holland's book about populations of reproductive structures apply to sets of classifiers functioning in an adaptive system as disclosed in the present application.

Chapter 6 established theorems about the expected number of offspring of reproductive structures, and about the effect of repeated applications of a crossover operator on segments of reproductive structures. It also contains theorems on the role of mutation in adaption. One theorem established that mutation is a background operator assuring that the crossover operator has a full range of schemata (segments of reproductive structures) so that the adaptive systems is not trapped on local optima. Another theorem establishes minimum rates of mutation needed for adaptation with and without dominance. There is also a discussion of the role of inversion as a genetic operator.

[Chapter 6, and 7 also, treat adaptive systems which are represented in fixed languages. But Chapter 8, "Adaptive Codings and Representations", discusses the possibility of making the representation adaptive. This chapter suggests a formal language in which algorithms are represented as strings of instructions with don't care symbols for generality, and whose output signals would be broadcast to other such strings. This shows that the theoretical result of Chapters 6 and 7 extends to representations.]

Theorem 6.2.3 of chapter 6 is of particular importance because it "provides the first evidence of the intrinsic parallelism of genetic plans. EACH schema represented in the population [or set of instances acted upon by the reproductive plan] increases or decreases [in frequency] . . . independently of what is happening to other schemata in the population. The proportion of each schema is essentially determined by its average performance . . . "(p. 103).

This result is developed further in Chapter 7, "The Robustness of Genetic Plans". It is stated there that even though these adaptive systems explicitly test and rank reproductive structures, they are implicitly testing and ranking schemata. Since a single schema belongs to many reproductive structures, all these reproductive structures are being tested in parallel. This kind of parallelism is called "intrinsic parallelism". An adaptive system making appropriate use of mutation and crossover and being repeatedly tested by an environment possesses intrinsic parallelism (p. 127).

Thus the learning and discovery ability of a classifier system with bucket brigade and genetic algorithms derives from the following fact. While classifiers are the units which are being explicitly tested, in making these tests the system is also testing segments of classifiers (schemata) constructed on the alphabet (0,1,#). This is so because these segments (schemata) tend to be preserved by the crossover operation, and hence are building blocks for computer instructions (classifiers).

Individual letters or characters (0,1,#) are the building blocks from which classifiers are made. But since schemata are preserved by crossover and are of more than one character (letter) in length, they are also building blocks of classifiers, though on a higher grammatical level than individual characters. It follows from these theoretical results that a classifier system with bucket brigade and genetic algorithms does its learning and discovery experimentation on two levels rather than one. The crossover operator tests sequences of letters (schemata), while mutation operator tests individual letters.

In a classifier system with the bucket-brigade algorithm the classifiers compete with one another in producing and marketing new messages. After a classifier program has run for some time the strength of each classifier reflects its contribution to the success of the whole system. Since the performance of a classifier depends on its constituent schemata, the strength of a classifier is an indirect measure of the merits of these schemata. As the preceding theory shows, a classifier system is somewhat analogous to an evolving biological system. Consequently, the merit of a schemata as reflected in the strength of its classifier is somewhat analogous to the fitness of a coadapted set of genes in biology.

A classifier system with bucket brigade and genetic algorithms investigates and exploits the learning potentialities of many different classifiers by testing the learning capabilities of single classifiers. Hence classifier systems possess intrinsic parallelism. The classifiers operating in a program at any major cycle constitute a sample of a very large space (set) of classifiers. The genetic algorithm uses the sampling results of the bucket brigade algorithm to produce promising classifiers from this set of possibilities for further testing by the bucket brigade algorithm.

To conclude: When an individual classifier is tested in a learning and discovery program, all the schemata or building blocks of which it is composed are tested. Each schema is a building block for many possible classifiers, and hence ALL these possible classifiers are being tested at the same time. This is the INTRINSIC PARALLELISM of a classifier learning and discovery system.

In accordance with the present invention, the classifier system with bucket brigade and genetic algorithms which has been disclosed, is the first computing system known to embody and make practical the theoretical adaptive possibilities described above.

It is to be understood that the specific computing methods and apparatus which have been described are merely illustrative of one application of the principles of the invention and numerous modifications may be made to the subject matter disclosed without departing from the true spirit and scope of the invention.

What is claimed is:

1. An adaptive computing system comprising, in combination,
   a message memory for storing a plurality of messages, each message being represented by a sequence of binary digits;
   a classifier memory for storing a plurality of classifiers, each such classifier consisting of a condition part identifying a subset of messages in said message memory which are to be translated into result messages, an action part which specifies the functional relationship between the messages in said subset and said result messages, and a strength value;

processing means for producing the result messages specified by each of said classifiers, said processing means further including bid generating means for producing a bid value for each given one of said classifiers which produces at least one of said result messages, said bid value being related to the strength value of said given classifier and being further related to the strength values of those classifiers which produced the messages in the subset specified by the condition part of said given classifier, and selection means responsive to said bid value for placing the result messages specified by only chosen ones of said classifiers in said message memory for further processing.

2. An adaptive computing system as set forth in claim 1 wherein said bid value produced by said bid generating means is further directly related to the specificity with which the condition part of said given classifier specifies said subset.

3. An adaptive computing system as set forth in claim 1 wherein said bid value is directly proportional to the strength value of said given classifier.

4. An adaptive computing system as set forth in claim 1 wherein said bid value is directly related to the sum of bid values previously generated for those classifiers which produced the messages specified by the condition part of said given classifier.

5. An adaptive computing system as set forth in claims 1, 2, 3, or 4 further including means for periodically reducing the strength values of at least selected ones of the classifiers in said classifier memory.

6. An adaptive computing system as set forth in claim 5 wherein said selected classifiers comprise all of the classifiers in said classifier memory.

7. An adaptive computing system as set forth in claim 5 wherein said selected classifiers comprise those classifiers for which a bid value is produced.

8. An adaptive computing system as set forth in claim 5 wherein said selected classifiers comprise said chosen classifiers.

9. In an adaptive computing system of the class comprising, in combination, storage means for storing a plurality of messages and a plurality of classifiers, each of said classifiers comprising:

a condition part which specifies the attributes of selected ones of said messages, an action part which specifies the functional relationship between the information content of said selected messages and at least one output message, and a strength value for indicating the past performance of said classifier during the course of operation of said adaptive computing system, and processing means for comparing the condition part of each of said classifiers in said storage means with each of said messages in said storage means to identify said selected messages, said processing means further including:

means for generating a bid-value whenever the condition part of a given classifier is satisfied, said bid value being related to the strength value of said given classifier, means for placing those output messages generated by successful classifiers which produce relatively larger bid-values in said storage means for further processing, and means for increasing the strength value associated with said successful classifiers, the improvement comprising processing means for varying said bid value in response to the combined strength values of those classifiers which generated said selected messages.

10. An adaptive computing system as set forth in claim 9 wherein each generated bid value is proportional to the strength of said given classifier.

11. An adaptive computing system as set forth in claim 9 wherein said bid value is directly related to the sum of the bid values associated with said selected messages.

12. An adaptive computing system as set forth in claims 9, 10 or 11 wherein said means for increasing the strength value associated with said successful classifiers increases the strength value of only those successful classifiers which produce messages which subsequently satisfy the condition part of a further successful classifier.

13. An adaptive computing system as set forth in claim 12 wherein said strength value is increased by an amount directly related to the bid value produced by said further successful classifier.

14. An adaptive computing system as set forth in claim 12 including means for maintaining a system treasury value which is increased in direct relation to each decrease in an individual classifier's strength value and which is decreased in direct relation to any increase in an individual classifier's strength value.

15. In an adaptive computing system of the class comprising, in combination, storage means for storing a plurality of messages and a plurality of classifiers, each of said classifiers comprising:

a condition part which specifies the attributes of selected ones of said messages, an action part which specifies the functional relationship between the information content of said selected messages and at least one output message, and a strength value for indicating the past performance of said classifier during the course of operation of said adaptive computing system, and processing means for comparing the condition part of each of said classifiers in said storage means with each of said messages in said storage means to identify said selected messages, said processing means further including:

means for placing those output messages generated by successful classifiers having larger strength values in said storage means for further processing, and means for increasing the strength value associated with said successful classifiers, the improvement comprising processing means for periodically reducing the strength value associated with all of said classifiers in said storage means whereby the strength of those classifiers which fail to produce messages with acceptable strength values is eventually diminished relative to others of said classifiers.

16. An adaptive computing system as set forth in claim 15 further including means for reducing the strengths of all those classifiers whose conditions are satisfied.

17. In an adaptive computing system of the class comprising, in combination, storage means for storing a plurality of messages and a plurality of classifiers, each of said classifiers comprising:

a condition part which specifies the attributes of selected ones of said messages, an action part which specifies the functional relationship between the information content of said selected messages and at least one output message, and a strength value for indicating the past performance of said classifier during the course of operation of said adaptive computing system, and processing means for comparing the condition part of each of said classifiers in said storage means with each of said messages in said storage means to identify said selected messages, said processing means further including:

means for placing those output messages generated by successful classifiers having larger strength values in said storage means for further processing, and means for increasing the strength value associated with said successful classifiers; and an input interface for generating input messages for use in said system derived from a source external to said system;

the improvement wherein said input interface further includes means for generating an intensity value associated with each of said input messages which is functionally equivalent to a bid value proportional to said strength value associated with classifier-produced messages whereby messages produced by said input means are treated as if they had been generated by a classifier making a comparable bid.

18. An adaptive computing system as set forth in claim 17 including means for forming new classifiers of quasi-random content having condition parts adapted to be satisfied by said input messages.

19. In an adaptive computing system of the class comprising, in combination, storage means for storing a plurality of messages and a plurality of classifiers, each of said classifiers comprising:

a condition part which specifies the attributes of selected ones of said messages, an action part which specifies the functional relationship between the information content of said selected messages and at least one output message, and a strength value indicative of the past performance of said classifier in said system;

processing means for comparing the condition part of each of said classifiers in said storage means with each of said messages in said storage means to identify said selected messages, said processing means further including means for placing selected ones of the output messages generated by classifiers whose condition part is satisfied into said storage means for further processing, and means for periodically producing new classifiers which are modified versions of one or more existing classifiers in said storage means:

the improvement wherein said classifiers include positional punctuation marks imbedded therein and wherein said means for producing new classifiers includes means for combining parts of existing classifiers formed by dividing said existing classifiers at positions determined by the placement of said punctuation marks.

20. In an adaptive computing system of the class comprising, in combination, storage means for storing a plurality of messages and a plurality of classifiers, each of said classifiers comprising:

a condition part which specifies the attributes of selected ones of said messages, an action part which specifies the functional relationship between the information content of said selected messages and at least one output message, and a strength value indicative of the past performance of said classifier in said system;

processing means for comparing the condition part of each of said classifiers in said storage means with each of said messages in said storage means to identify said selected messages, said processing means further including means for placing selected ones of the output messages generated by classifiers whose condition part is satisfied into said storage means for further processing, and means for periodically producing new classifiers having an information content derived in part from selected classifiers in said storage means;

the improvement wherein said means for producing new classifiers further includes means for deriving the content of new classifiers from the information content of selected messages in said storage means.

21. An adaptive computing system as set forth in claim 20 wherein said means for deriving the content of new classifiers from the content of existing messages includes means for monitoring the number of new messages being produced from classifiers and activating the production of classifiers from messages whenever that number falls below a predetermined acceptable level.

22. In an adaptive computing system of the class comprising, in combination, storage means for storing a plurality of messages and a plurality of classifiers, each of said classifiers comprising:

a condition part which specifies the attributes of selected ones of said messages, an action part which specifies the functional relationship between the information content of said selected messages and at least one output message, and a strength value indicative of the past performance of said classifier in said system;

processing means for comparing the condition part of each of said classifiers in said storage means with each of said messages in said storage means to identify said selected messages, said processing means further including means for placing selected ones of the output messages generated by classifiers whose condition part is satisfied into said storage means for further processing, and means for periodically producing new classifiers which are modified versions of one or more existing classifiers in said message store;

the improvement wherein said means for producing new classifiers includes means for forming first and second classifiers which operate in succession, the first of said classifiers generating an output message which thereafter satisfies the condition part of the second of said classifiers whereby a message at one time which satisfies the condition part of said first classifier necessarily produces an output message from said second classifier at a later time.

23. An adpative computing system as set forth in claim 22 wherein said first and second classifiers are derived from third and fourth existing classifiers which act in succession, said first classifier having a condition part derived from the condition part of said third classifier and said second classifier having an action part derived from said fourth classifier.

24. An adaptive computing system comprising, in combination, a central computing unit including means for storing a plurality of messages, a plurality of independent processing units, each of which includes means for storing a classifier, said classifier comprising a condition part which specifies the attributes of selected ones of the messages stored in central computing unit, an action part which specifies the functional relationship between the information content of said selected messages and at least one output message, and a strength value indicative of the past performance of said classifier; parallel switching means for interconnecting said independent processing units;

broadcast switching means for interconnecting said central computer with each of said independent processing units;

an input interface for providing data to said central computing unit in the form of messages from a source external to said system; and an output interface for providing result information derived from selected ones of said messages to utilization means for external to said computing system, wherein said central computing unit transmits said messages to said independent units via said broadcast switch, said independent units compare said messages with said classifiers, and wherein selected result messages produced by selected ones of said independent processors are returned via said broadcast switch to said central computing unit.

25. An adaptive computing system as set forth in claim 24 wherein each of said independent processors calculates a bid value proportional to said strength value whenever a message from said central unit satisfies the condition part of said classifier, wherein said central computing unit transmits to said independent processors a sequence of descending bid floor values, and wherein each of said independent processors returns to said central computer a result message only if the calculated bid value associated with that result message exceeds the current bid floor value most recently transmitted from said central unit.

26. An adaptive computing system unit as set forth in claim 24 or 25 wherein the strength value of a first classifier which generated a message subsequently employed by a second classifier is increased by an amount communicated to the independent processor handling said first classifier from the processor handling said second classifier via said parallel switching means.

* * * * *